United States Patent
Kakii

(10) Patent No.: US 7,583,848 B2
(45) Date of Patent: Sep. 1, 2009

(54) SCRAMBLING OF IMAGE PORTIONS VIA COLOR COMPONENT INTERCHANGE

(75) Inventor: Hiroshi Kakii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 876 days.

(21) Appl. No.: 10/769,191

(22) Filed: Jan. 30, 2004

(65) Prior Publication Data

US 2004/0184772 A1    Sep. 23, 2004

(30) Foreign Application Priority Data

Jan. 31, 2003    (JP)    ............... 2003-025131

(51) Int. Cl.
*G06K 9/46*    (2006.01)
*H04N 7/167*    (2006.01)

(52) U.S. Cl. .................. 382/240; 380/201; 380/217

(58) Field of Classification Search ................. 382/240; 380/217, 201
See application file for complete search history.

(56) References Cited

U.S. PATENT DOCUMENTS

| | | | |
|---|---|---|---|
| 5,590,194 A * | 12/1996 | Ryan | 380/213 |
| 6,505,299 B1 * | 1/2003 | Zeng et al. | 713/160 |
| 6,801,672 B1 * | 10/2004 | Thomas | 382/275 |
| 7,221,761 B1 * | 5/2007 | Deshpande et al. | 380/216 |
| 2004/0028227 A1 * | 2/2004 | Yu | 380/201 |

FOREIGN PATENT DOCUMENTS

| | | |
|---|---|---|
| JP | 05-081351 | 4/1993 |
| JP | 07-115638 | 5/1995 |
| JP | 08-009359 | 1/1996 |
| JP | 09-114431 | 5/1997 |
| JP | 2001-211310 | 8/2001 |
| JP | 2001-218184 | 8/2001 |
| JP | 2002-135594 | 5/2002 |

OTHER PUBLICATIONS

Japanese Office Action, Notice of Rejection of Japanese Patent Application No. 2003-025131, Issue Date Sep. 11, 2007 ( pages).

* cited by examiner

*Primary Examiner*—John B Strege
(74) *Attorney, Agent, or Firm*—Blakely, Sokoloff, Taylor & Zafman LLP

(57) ABSTRACT

An image processing apparatus that is capable of presenting a general overview of the contents of an original image from its corresponding scrambled image is disclosed. The image processing apparatus applies a discrete wavelet transform to a pixel value of each of at least one rectangular region into which image data are divided and hierarchically compresses the image data into a compressed code stream. Then the image processing apparatus performs a scrambling process on compressed code within the compressed code stream that is of a level corresponding to a high resolution image component and refrains from performing the scrambling process on compressed code other than that of the level corresponding to the high resolution image component.

15 Claims, 18 Drawing Sheets

FIG.3
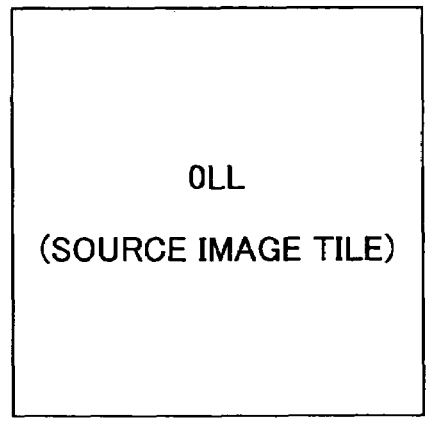
DECOMPOSITION_LEVEL_0
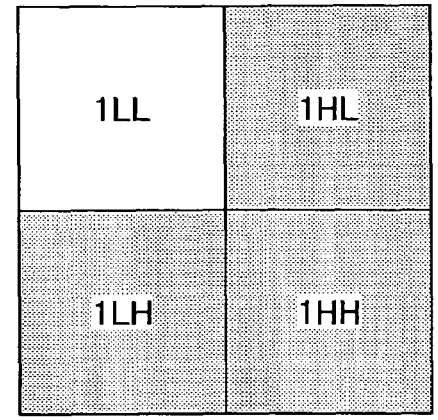
DECOMPOSITION_LEVEL_1
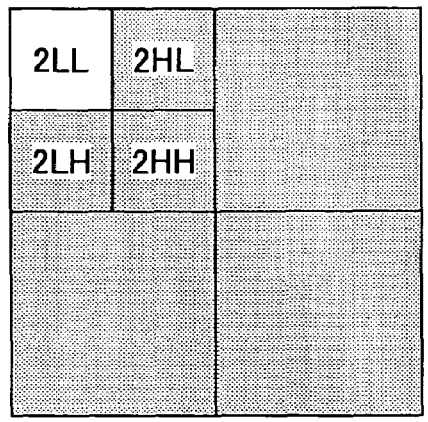
DECOMPOSITION_LEVEL_2
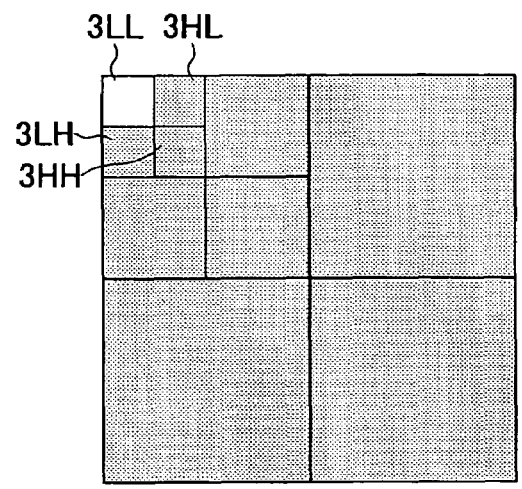
DECOMPOSITION_LEVEL_3

FIG.11

R COMPONENT (C0)

| R00 | R01 | R02 | R03 |
|---|---|---|---|
| R04 | R05 | R06 | R07 |
| R08 | R09 | R10 | R11 |
| R12 | R13 | R14 | R15 |

201

G COMPONENT (C1)

| G00 | G01 | G02 | G03 |
|---|---|---|---|
| G04 | G05 | G06 | G07 |
| G08 | G09 | G10 | G11 |
| G12 | G13 | G14 | G15 |

202

B COMPONENT (C2)

| B00 | B01 | B02 | B03 |
|---|---|---|---|
| B04 | B05 | B06 | B07 |
| B08 | B09 | B10 | B11 |
| B12 | B13 | B14 | B15 |

R COMPONENT (C0)

| R00 | R01 | R02 | R03 |
|---|---|---|---|
| R04 | G05 | B06 | R07 |
| R08 | B09 | R10 | R11 |
| R12 | R13 | R14 | R15 |

201  211

G COMPONENT (C1)

| G00 | G01 | G02 | G03 |
|---|---|---|---|
| G04 | B05 | R06 | G07 |
| G08 | G09 | B10 | G11 |
| G12 | G13 | G14 | G15 |

202  211

B COMPONENT (C2)

| B00 | B01 | B02 | B03 |
|---|---|---|---|
| B04 | R05 | G06 | B07 |
| B08 | R09 | G10 | B11 |
| B12 | B13 | B14 | B15 |

| SOC | R00 | R01 | R02 | R03 | R04 | R05 | R06 | R07 | R08 | R09 | R10 | R11 | R12 | R13 | R14 | R15 | R COMPONENT (C0) |

| G00 | G01 | G02 | G03 | G04 | G05 | G06 | G07 | G08 | G09 | G10 | G11 | G12 | G13 | G14 | G15 | G COMPONENT (C1) |

| B00 | B01 | B02 | B03 | B04 | B05 | B06 | B07 | B08 | B09 | B10 | B11 | B12 | B13 | B14 | B15 | EOC | B COMPONENT (C2) |

FIG.15

R COMPONENT (C0): | SOC | R00 | R01 | R02 | R03 | R04 | G05 | B06 | R07 | R08 | B09 | R10 | R11 | R12 | R13 | R14 | R15 |

G COMPONENT (C1): | G00 | G01 | G02 | G03 | G04 | B05 | R06 | G07 | G08 | G09 | B10 | G11 | G12 | G13 | G14 | G15 |

B COMPONENT (C2): | B00 | B01 | B02 | B03 | B04 | R05 | G06 | B07 | B08 | R09 | G10 | B11 | B12 | B13 | B14 | B15 | EOC |

TILE # TO BE SCRAMBLED

SCRAMBLED COLOR COMPONENTS (NORMALLY IN THE ORDER C0, C1, C2)

WHOLE IMAGE

THUMBNAIL IMAGE

SCRAMBLING OF IMAGE PORTIONS VIA COLOR COMPONENT INTERCHANGE

The present application claims priority to the corresponding Japanese Application No. 2003-025131, filed on Jan. 31, 2003, the entire contents of which are hereby incorporated by reference.

BACKGROUND OF THE INVENTION

1. Field of the Invention

The present invention relates to an image processing apparatus, a program, and a storage medium.

2. Description of the Related Art

With the recent developments of image input/output technologies, there is a growing demand for higher image resolution. Taking the digital camera as an example of an image input apparatus, the price of a high performance charge coupled device (CCD) that has 3 million or more pixels is decreasing and this device is therefore starting to be widely used even in products that are within a commercially popular price range. Higher resolution and price reduction can also be seen in the fields of image output apparatuses and image display apparatuses, where hard-copy technologies applied to printers such the laser printer and the ink jet printer, for example, as well as soft-copy technologies applied to displays such as the CRT and LCD, for example, are developing.

With the introduction of such high-performance low-priced image input/output products to the market, high resolution images are becoming increasingly popular. Thus, in the future, it is expected that high resolution images will be in demand for all kinds of applications.

Under such circumstances, demand for improved compression/decompression technologies to facilitate handling of high resolution images will undoubtedly be on the rise as well. Accordingly, image compression technologies that satisfy such demand have been developed in the conventional art. An example of such technologies is the so-called JPEG 2000 technology, which enables processing of a high resolution image by subdividing the image into small units upon compression so that a high quality image can be decoded from the reduced image despite the use of a high compression rate.

In the conventional art, a technique of scrambling the image data is widely used when image data are handled for commercial purposes, for example. A typical application of such a technique can be seen in the distribution of contents over the Internet. Specifically, in a setting under the Internet environment where contents are provided to a user apparatus that makes access to a content-providing site, in some cases, depending on the type of contents, a commercial value may be attributed to image data being provided as the contents. In such case, when the image data corresponding to the contents are sent to a user apparatus, the user may view the image data and distribute the data to others, and thereby, the commercial value of the contents may be lost. To prevent such a loss, the image data provided as the contents may be scrambled so that a user may be unable to view the image data.

In this aspect, there is a growing demand for a technique for scrambling image data compressed according to the JPEG 2000 format. For example, in the prior art, a technique is disclosed in Japanese Laid-Open Patent Publication No. 2001-218184 for scrambling image data of an entire image or an area corresponding to a region of interest (ROI) by applying a scramble transform on quantized and encoded sub-band or bit plane data obtained from a wavelet transform process, which is a characteristic feature of the JPEG 2000 format.

In the case where scrambling of image data is realized by applying a scramble transform on quantized and encoded sub-band or bit plane data obtained from a wavelet transform process according to the JPEG 2000 format, the scrambled image data have no trace of the original image, and the original image cannot be recognized from the scrambled image.

However, in some cases such as the above example of providing image data as contents to a user over the Internet, it is preferred that the original image be recognizable to some extent from the scrambled image. That is, according to the nature of the human psyche, the desire to view an image in its proper state becomes stronger in a case where the image can be recognized to a certain degree but not enough to enjoy the image, for example, compared to a case in which the image is totally undecipherable. Thus, a technique for scrambling image data is required in which the original image can be recognized to some extent from the scrambled image.

SUMMARY OF THE INVENTION

An image processing apparatus, program, and storage medium are described. In one embodiment, the image processing apparatus applies a discrete wavelet transform to a pixel value of each of at least one rectangular region into which image data are divided, hierarchically compresses the image data into a compressed code stream, and stores the compressed code stream to realize a data providing service, and comprises: a scrambling unit to perform a scrambling process on compressed code of a level corresponding to a high resolution image component within the compressed code stream and refraining from performing the scrambling process on code other than the compressed code of the level corresponding to the high resolution image component.

BRIEF DESCRIPTION OF THE DRAWINGS

FIG. 3 is a diagram illustrating sub-bands at each decomposition level in a case where a 3-level wavelet decomposition is performed;

FIG. 11 is a diagram illustrating tiles of components R, G, and B of encoded source image data that are not scrambled;

FIG. 12 is a diagram illustrating tiles of components R, G, and B of encoded image data that are scrambled;

FIG. 14 is a data diagram illustrating code stream data of tiles of the components R, G, and B, generated by a tag processing unit, the code stream being in a state before a scrambling process is performed thereon;

FIG. 15 is a data diagram illustrating code stream data of tiles of the components R, G, and B, generated by a tag processing unit, on which code stream the scrambling process is performed;

FIGS. 21A-21C are diagrams illustrating a scrambling process according to one embodiment of the present invention, wherein FIG. 21A shows a source image, FIG. 21B shows a scrambled image in a case where the source image is divided into 4 tiles, and FIG. 21C shows a scrambled image in a case where the source image is divided into 16 tiles.

DESCRIPTION OF THE PREFERRED EMBODIMENTS

Figure 1:
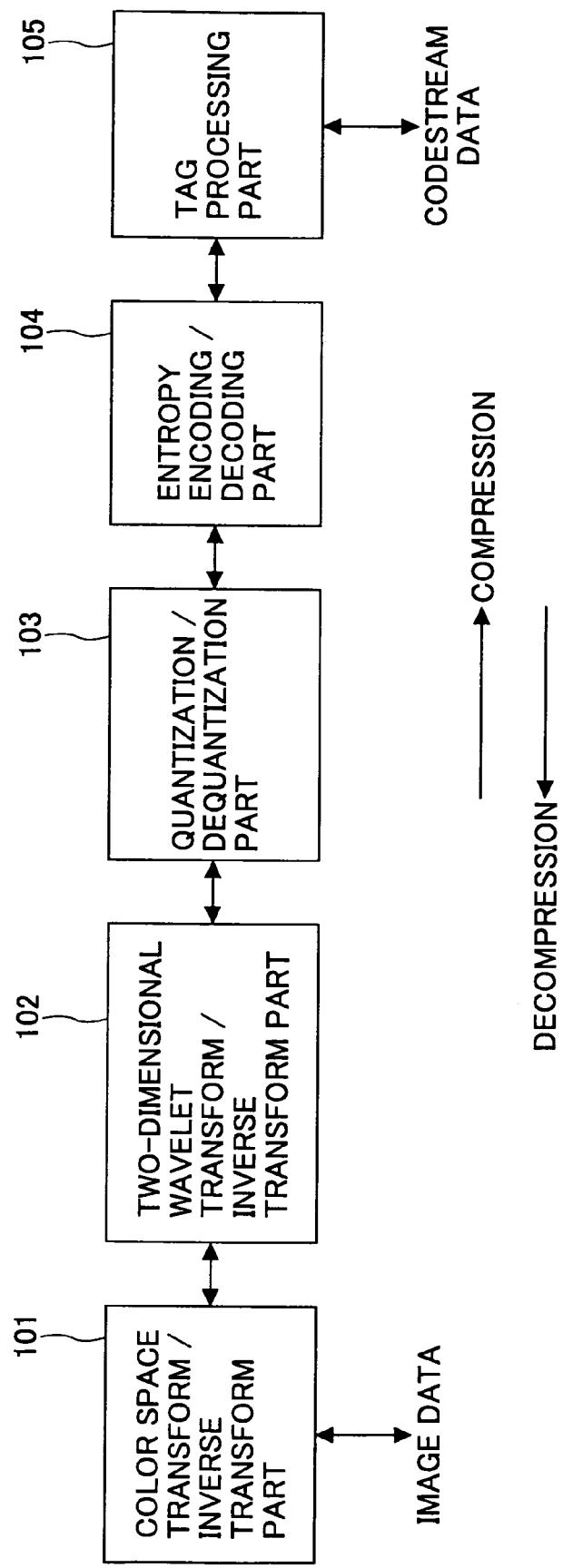
FIG. 1 is a block diagram illustrating a hierarchial encoding algorithm, which corresponds to a basic procedure according to the JPEG 2000 standard.

Embodiments of the present invention comprise an image processing apparatus, a program, and a storage medium for presenting a general overview of the contents of an original image from its corresponding scrambled image.

Specifically, an image processing apparatus of one embodiment of the present invention applies a discrete wavelet transform to a pixel value of each of at least one rectangular region into which image data are divided, hierarchically compresses the image data into a compressed code stream, and stores the compressed code stream to realize a data providing service, the apparatus includes a scrambling unit to perform a scrambling process on compressed code of a level corresponding to a high resolution image component within the compressed code stream and refrain from performing the scrambling process on code other than the compressed code of the level corresponding to the high resolution image component.

By performing a scrambling process on a level corresponding to a high resolution image component, the decoded image as a whole may be in a scrambled state but a reduced image that is obtained by decoding compressed code of a level corresponding to a low resolution component may be in an unscrambled state. Thus, the reduced image may be provided for viewing as a thumbnail image, for example, so that a general overview of the contents of the image may be appreciated.

Another image processing apparatus according to one embodiment of the present invention applies a discrete wavelet transform to a pixel value of each of at least one rectangular region into which image data are divided, hierarchically compresses the image data into a compressed code stream, and stores the compressed code stream to realize a data providing service, and includes scrambling means for performing a scrambling process on compressed code of a predetermined rectangular region within the compressed code stream.

By performing the scrambling process on compressed code of a predetermined rectangular region, portions of the decoded image may be scrambled whereas other portions of the image may be in an unscrambled state. Thus, the unscrambled portions of the image may be viewed in order to present a general overview of the contents of the image.

Further, in the image processing apparatuses of one embodiment of the present invention, the scrambling unit may perform the scrambling process by interchanging color components of rectangular regions corresponding to a same position.

In this way, the shape being represented in an image may not be changed; rather, the color attributed to the shape of the image may be changed. Thus, the original image may be recognizable from the scrambled image to a certain degree.

In one embodiment, an article of manufacture has one or more recordable media storing a program thereon, which is interpreted by a computer included in an image processing apparatus that applies a discrete wavelet transform to a pixel value of each of at least one rectangular region into which image data are divided, hierarchically compresses the image data into a compressed code stream, and stores the compressed code stream to realize a data providing service, and the program causes the computer to perform: a scrambling function for executing a scrambling process on compressed code of a level corresponding to a high resolution image component within the compressed code stream and refraining from executing the scrambling process on code other than the compressed code of the level corresponding to the high resolution image component.

In one embodiment, an article of manufacture has one or more recordable media storing a program thereon, which is interpreted by a computer included in an image processing apparatus that applies a discrete wavelet transform to a pixel value of each of at least one rectangular region into which image data are divided, hierarchically compresses the image data into a compressed code stream, and stores the compressed code stream to realize a data providing service, and the program causes the computer to perform: a scrambling function for executing a scrambling process on compressed code of a predetermined rectangular region within the compressed code stream.

In one embodiment, an article of manufacture has one or more recordable media storing a program thereon, which is interpreted by a computer included in an image processing apparatus that applies a discrete wavelet transform to a pixel value of each of at least one rectangular region into which image data are divided, hierarchically compresses the image data into a compressed code stream, and stores the compressed code stream to realize a data providing service, the program causing the computer to perform: a scrambling function for executing a scrambling process on compressed code of a level corresponding to a high resolution image component within the compressed code stream and refraining from executing the scrambling process on code other than the compressed code of the level corresponding to the high resolution image component.

In one embodiment, an article of manufacture has one or more recordable media storing a program thereon, which is interpreted by a computer included in an image processing apparatus that applies a discrete wavelet transform to a pixel value of each of at least one rectangular region into which image data are divided, hierarchically compresses the image data into a compressed code stream, and stores the compressed code stream to realize a data providing service, the program causing the computer to perform a scrambling function for executing a scrambling process on compressed code of a predetermined rectangular region within the compressed code stream.

In the following, embodiments of the present invention are described with reference to FIGS. 1-20.

First, descriptions are given of a hierarchial encoding algorithm and a JPEG 2000 algorithm based on which embodiments of the present invention are configured.

FIG. 1 is a block diagram illustrating a system for realizing the hierarchial encoding algorithm that corresponds to a basic algorithm according to the JPEG 2000 format. The system includes a color space transform/inverse transform unit 101, a two-dimensional wavelet transform/inverse transform unit 102, a quantization/dequantization unit 103, an entropy encoding/decoding unit 104, and a tag processing unit 105.

A major difference between the present system and the conventional JPEG system lies in the transform scheme. In the JPEG algorithm, DCT (discrete cosine transform) is implemented, whereas in the hierarchial encoding algorithm of JPEG 2000, DWT (discrete wavelet transform) is implemented at the two-dimensional wavelet transform/inverse transform unit 102. The DWT has an advantage over the DCT in that higher image quality can be obtained in areas where high compression rates are applied. This is one of the main reasons DWT is implemented in the hierarchial encoding algorithm of JPEG 2000, which has been developed from JPEG.

Another major difference lies in the fact that in the hierarchial encoding algorithm of JPEG 2000, the tag processing unit 105 is provided for generating code data in the last stage of the system. Specifically, at the tag processing unit 105, during a compression process of an image, compressed data are generated as code stream data, and during a decompression process of an image, an interpretation of the code stream data is performed for decompressing the image. The JPEG 2000 format is able to realize various advantageous functions by using code stream data For example, compression/decompression processes on a still image can be stopped at an arbitrary level of an octave division (decomposition level) in a block-based DWT process (refer to FIG. 3).

In many cases, the color space transform/inverse transform unit 101 is connected to an input/output unit for inputting and outputting the source image. The color space transform/inverse transform unit 101 may, for example, apply a color transform on a color system such as the RGB color system made up of primary color components R (red), G (green), and B (blue) and the YMC color system made up of complementary color components Y (yellow), M (magenta), and C (cyan) to obtain a YUV or YCbCr color system. The color space transform/inverse transform unit 101 may also perform an inverse of the above color transform process.

In the following, the JPEG 2000 algorithm is described.

Figure 2:
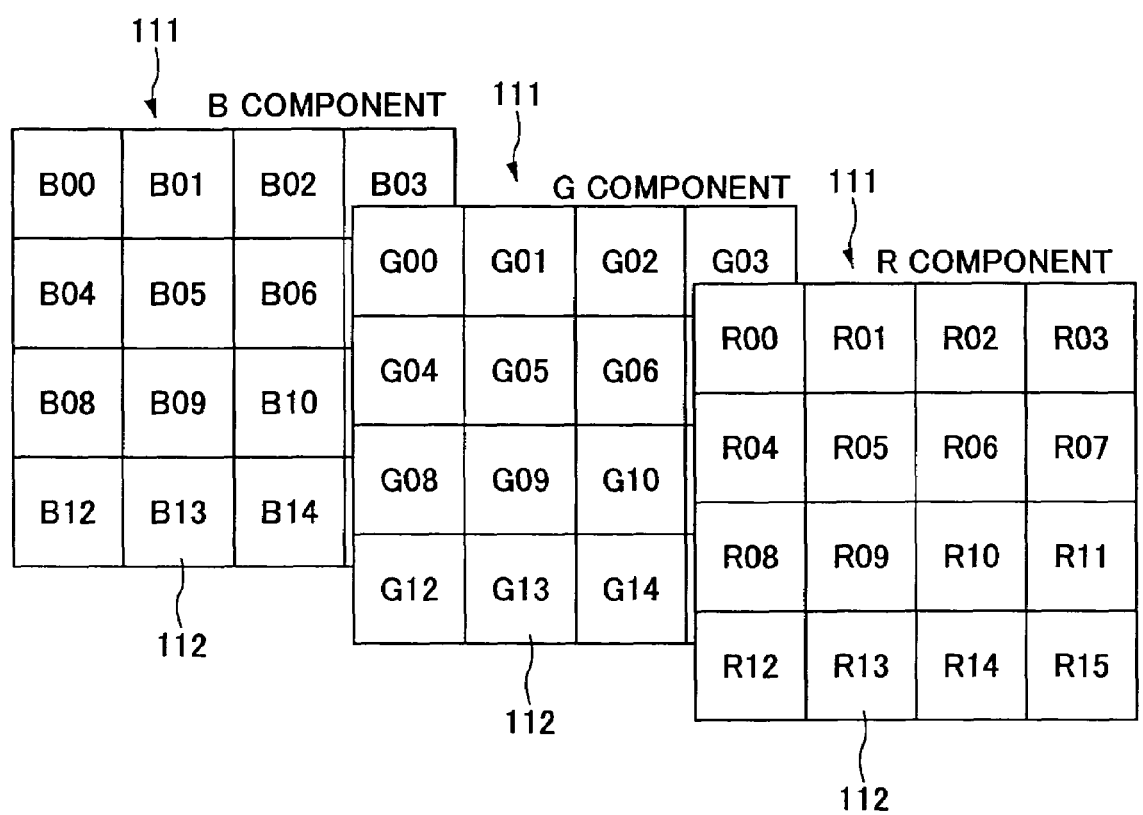
FIG. 2 is a diagram illustrating rectangular regions into which components of a source image are divided.

FIG. 2 is a diagram illustrating an example of how components of a source image are broken up into rectangular regions. Generally, in processing a color image, the components 111 (e.g., of the RGB color system) of a source image are subdivided into rectangular regions. The rectangular regions are referred to as blocks or tiles, and in the JPEG 2000 format, the term tile is generally used. Thus, in the following descriptions, the regions subdivided in this manner are referred to as tiles (i.e., in the example of FIG. 2, each of the components 111 is subdivided by 4×4 into 16 rectangular tiles 112). Each individual tile 112 (i.e., R00, R01, . . . , R15/G00, G01, . . . , G15/B00,B01, . . . ,B15) corresponds to a base unit on which an image data compression/decompression process is performed. Namely, the image data compression/decompression process is independently performed on each individual tile 112 of each component 111.

In the encoding of image data, each tile 112 of each component 111 is input to the color space transform/inverse transform unit 101 of FIG. 1, wherein a color transform process is performed. Then, a two-dimensional transform process (order transform) is performed at the two-dimensional wavelet transform unit 102 so that each tile 112 is spatially divided into frequency bands.

FIG. 3 shows sub-bands at each decomposition level for a case in which a 3-level wavelet decomposition is performed. At decomposition level 0, a source image tile 0LL that is obtained by dividing a source image into tiles is shown. At decomposition level 1, a two-dimensional wavelet transform is performed on the source image tile 0LL so that the tile 0LL is divided into sub-bands 1LL, 1HL, 1LH, and 1HH. Then, at decomposition level 2, the two-dimensional wavelet transform is further performed on the low frequency component 1LL to divide it into sub-bands 2LL, 2HL, 2LH, and 2HH. Then, in a similar manner, at decomposition level 3, the two-dimensional wavelet transform is further performed on the low frequency component 2LL to divide it into sub-bands 3LL, 3HL, 3LH, and 3HH. In FIG. 3, the sub-bands at each of the decomposition levels that are subjected to encoding are hatched. For example, at decomposition level 3, the sub-bands 3HL, 3LH, 3HH, 2HL, 2LH, 2HH, 1HL, 1LH, and 1HH that are hatched correspond to portions subject to encoding, but the sub-band 3LL is not to be encoded.

Next, the subject bit to be encoded is determined based on a designated encoding order, and at the quantization/dequantization unit 113, a context is generated from the bits surrounding the subject bit to be encoded.

Figure 4:
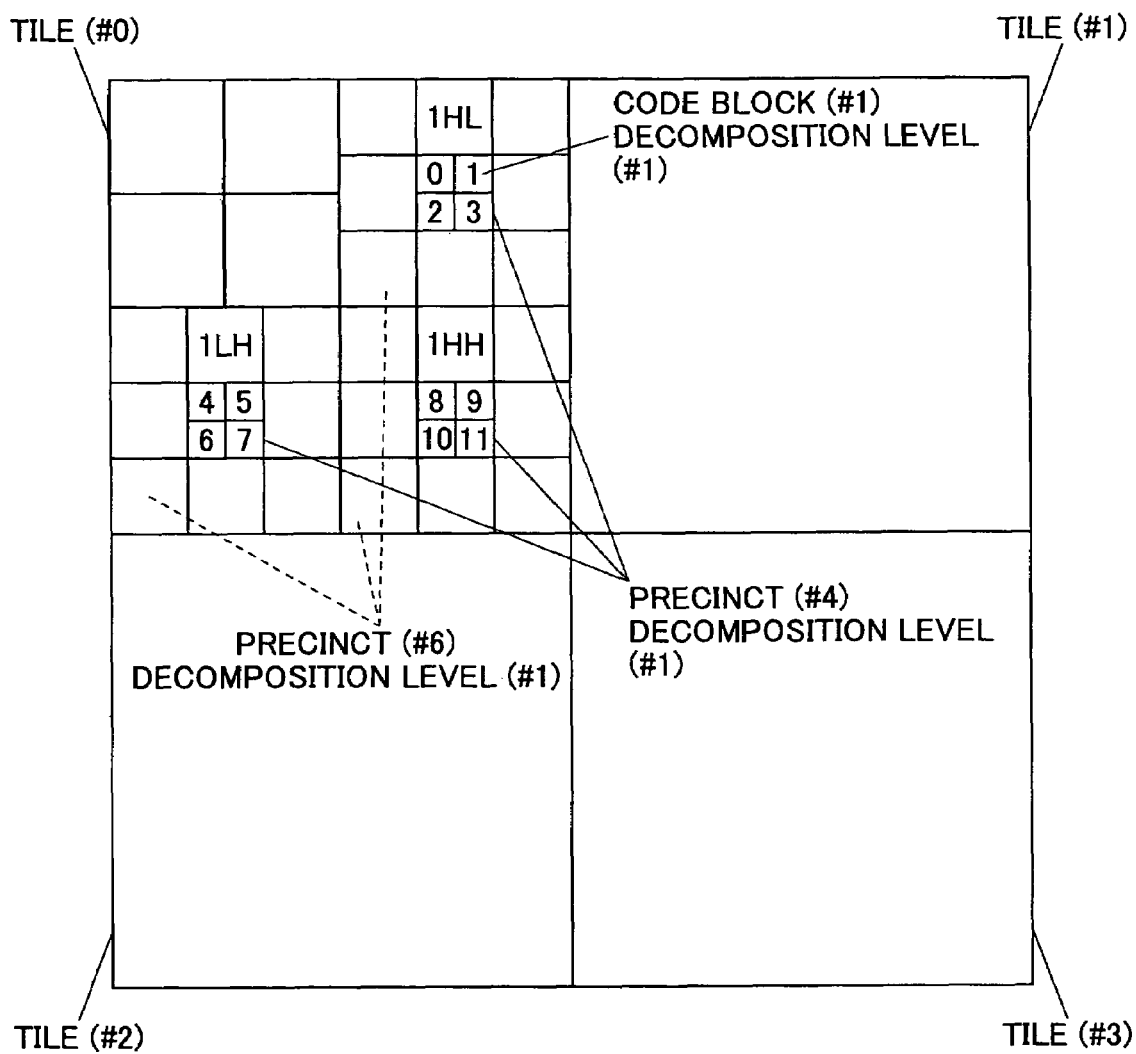
FIG. 4 is a diagram illustrating examples of precincts.

FIG. 4 is a diagram showing examples of precincts. For each sub-band, the wavelet coefficients on which the quantization processes have been performed are divided into rectangular regions called precincts that do not overlap with one another. The precincts are introduced in order to enable efficient use of the computer memory in the implementation. As is shown in FIG. 4, one precinct is made up of three spatially consistent rectangular regions. Further, each precinct is divided into rectangular code blocks that do not overlap with one another. This code block is used as a base unit for performing entropy encoding.

Figure 5:
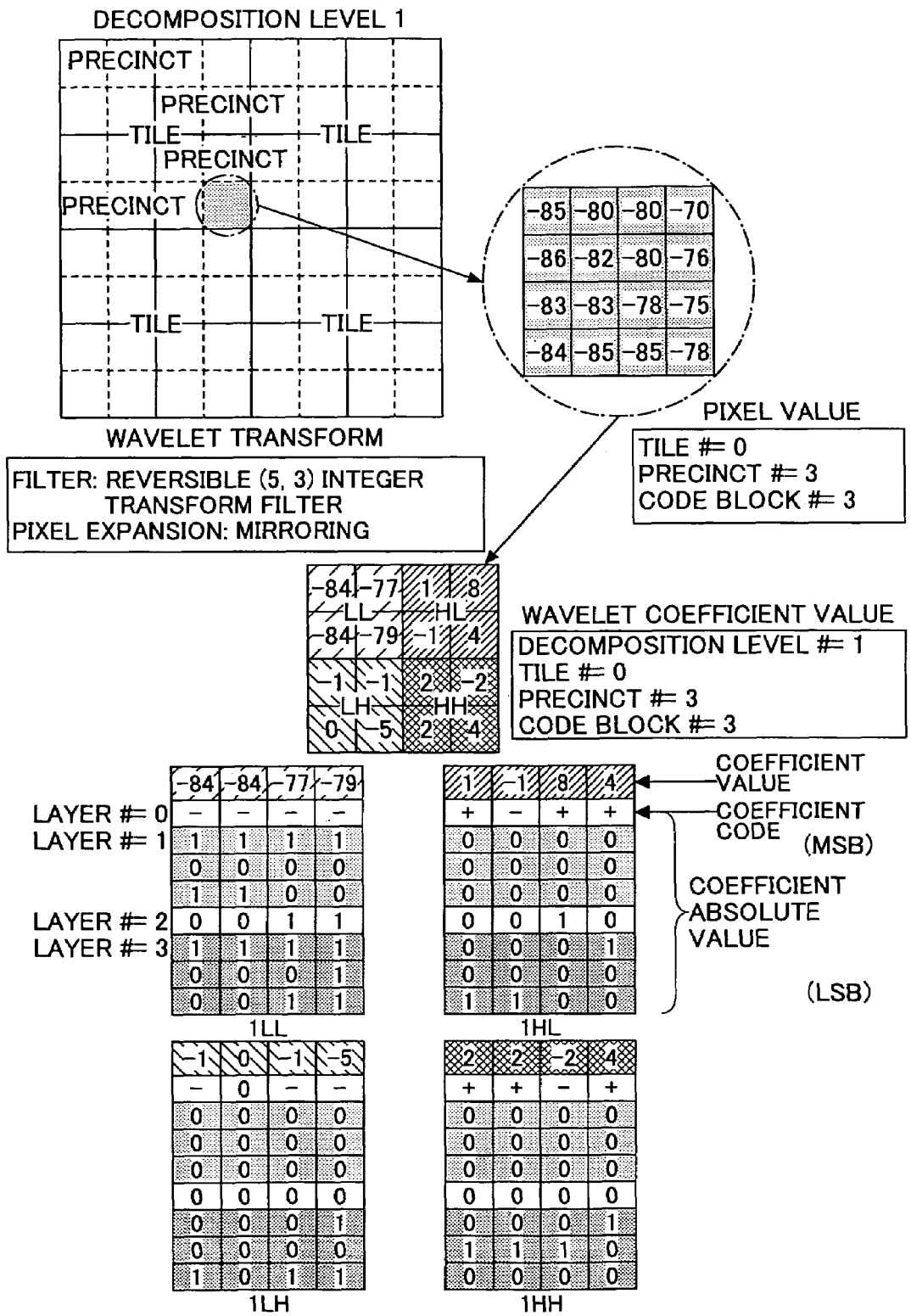
FIG. 5 is a diagram illustrating an exemplary process of assigning order to bit planes.

FIG. 5 is a diagram illustrating a process of decomposing the values of the two-dimensional wavelet coefficients obtained from the two-dimensional wavelet transform into bit plane units, and assigning the order of the bit planes for each pixel or code block. Although the coefficient values after the wavelet transform may be directly quantized and encoded, in JPEG 2000, the coefficient values may first be decomposed into bit plane units, and the order of bit planes may be assigned for each pixel or code block in order to improve encoding efficiency. FIG. 5 illustrates an outline of this process. In this exemplary process, a source image of 32×32 pixels is divided into four tiles each having 16×16 pixels, and the sizes of the precincts and the code blocks at decomposition level 1 are 8×8 pixels and 4×4 pixels, respectively. A precinct number and a code block number are assigned according to the raster order. In the present example, the precincts are assigned numbers from 0 to 3, and the code blocks are assigned numbers from 0 to 3. For pixel expansion beyond the tile border, a mirroring method is used to perform a wavelet conversion with a reversible (5, 3) filter to obtain wavelet coefficient values at decomposition level 1.

FIG. 5 also shows a schematic illustration of a representational "layer" of tile 0/precinct 3/code block 3. The transformed code block is divided into sub-bands 1LL, 1HL, 1LH, 1HH, and each sub-band is assigned wavelet coefficient values.

The structure of the layer can be easily comprehended when viewing the wavelet coefficient values from a horizontal direction (bit plane direction). One layer is made of an arbitrary number of bit planes. In this example, the layers 0, 1, 2, 3 have 1, 3, 1, 3 bit planes, respectively. The layer that includes a bit plane close to the LSB (least significant bit) is subjected to quantization first whereas the layer close to the MSB (most significant bit) remains without being quantized. The method of discarding layers starting with the layer closest to the LSB is called truncation and this method enables detailed control of the quantization rate. The process of discarding code until a predetermined compression rate is achieved is called post quantization, and this is a characteristic feature of the JPEG 2000 algorithm.

In the entropy encoding/decoding unit 104 of FIG. 1, an encoding process is performed on each tile 112 of each component 111 through probability estimation based on the context and the subject bit. In this way, an encoding process is performed on each of the components 111 of the source image in units of tiles 112. Then, the tag processing unit 105 performs a process of conjoining the encoded data from the entropy encoding/decoding unit 104 into one strand of code stream data and attaching tags thereto.

Figure 6:
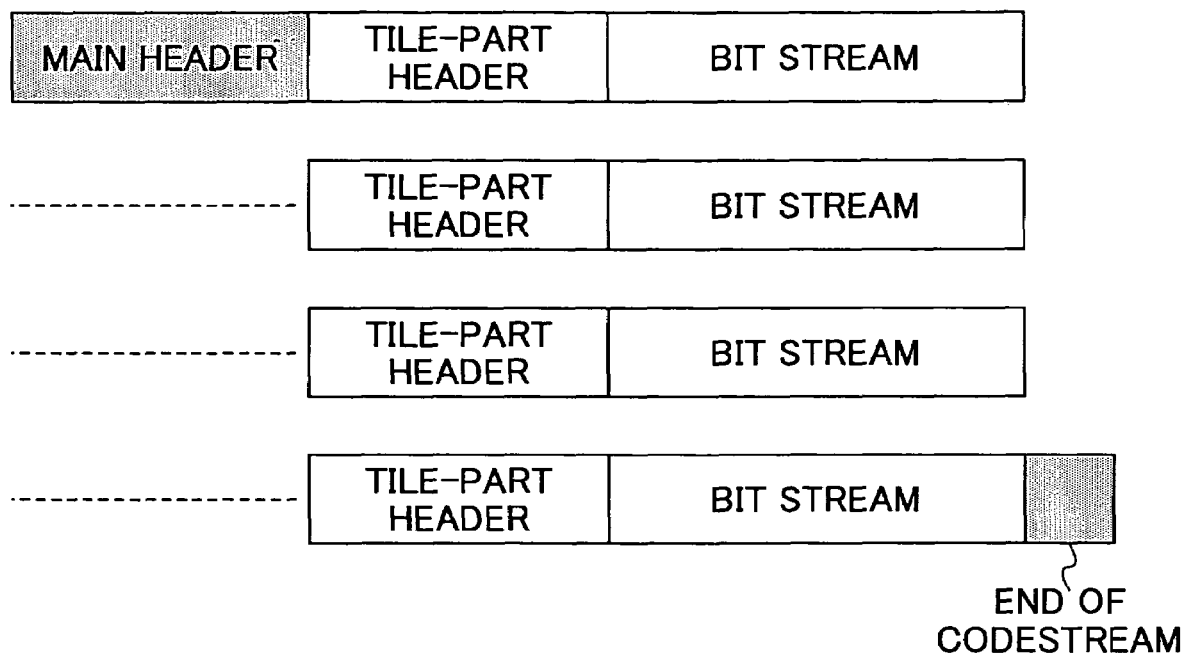
FIG. 6 is a data diagram illustrating an exemplary configuration of a frame of code stream data.

FIG. 6 is a diagram illustrating one frame of the code stream data. Tag information called a main header is attached to the front portion of the code stream data, and a tile part header is attached to the front portion of each set of encoded data corresponding to each tile (bit stream). The encoded data corresponding to each tile follows after the corresponding tile part header. It is noted that encoding parameters and quantization parameters, for example, may be described in the main header. At the end portion of the code stream data, a tag indicating the end of the code steam is attached.

Figure 7:
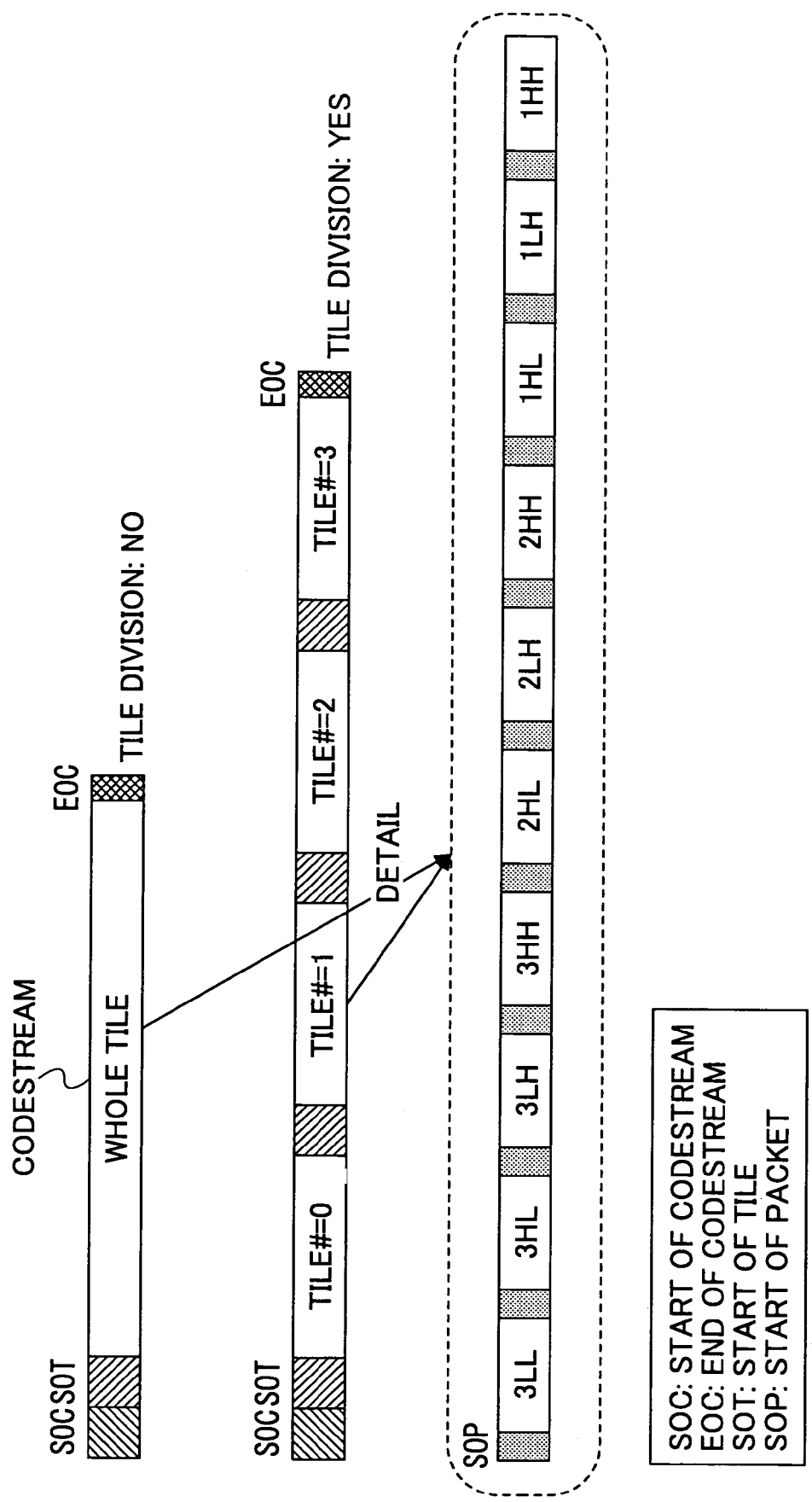
FIG. 7 is a data diagram illustrating a configuration of a code stream that represents the sub-bands of a packet containing encoded wavelet coefficient values.

FIG. 7 is a diagram illustrating an exemplary structure of a code stream that describes the sub-bands of a packet containing encoded wavelet coefficient values. As is shown in this drawing, the same packet stream structure can be obtained regardless of whether a division process into tiles is performed.

For decoding, the reverse of the above-described encoding process is performed; that is, image data are generated from the code stream of each tile 112 of each component 111. In this case, the tag processing unit 105 interprets the tag information attached to code stream data input from an external source, decomposes the code stream data into code stream data corresponding to each of the tiles 112 of each of the components 111, and the entropy encoding/decoding unit 104 performs a decoding process (decompression process) for each set of code stream data corresponding to each tile of each component 111. In this case, the positions of the bits are determined according to the order in which they are to be decoded based on the tag information within the code stream data, and in the quantization/dequantization unit 103, a context is generated from the array of surrounding bits of the subject bit position (on which decoding has already been performed). In the entropy encoding/decoding unit 104, decoding is performed through probability estimation based on the context and the code stream data in order to generate the subject bit, and the generated bit is written in the subject bit position. Since data decoded in this manner are spatially divided into frequency bands, each tile of each component of the image data may be restored by performing a two-dimensional wavelet inverse transform in the two-dimensional wavelet transfonm/inverse transform unit 102. The restored data can then be transformed into the original color system data by use of the color space transform/inverse transform unit 101.

In the following, one embodiment of the present invention is described. It is noted that the present embodiment described below is an example of an image compression/decompression technique that implements the JPEG 2000 format; however, the present invention is not limited to this embodiment.

A server computer, which corresponds to an image processing apparatus of the present embodiment, is controlled by an image processing program that is installed, interpreted, and executed therein to perform image processing. In the present embodiment, a storage medium that stores such an image processing program is also introduced.

Figure 8:
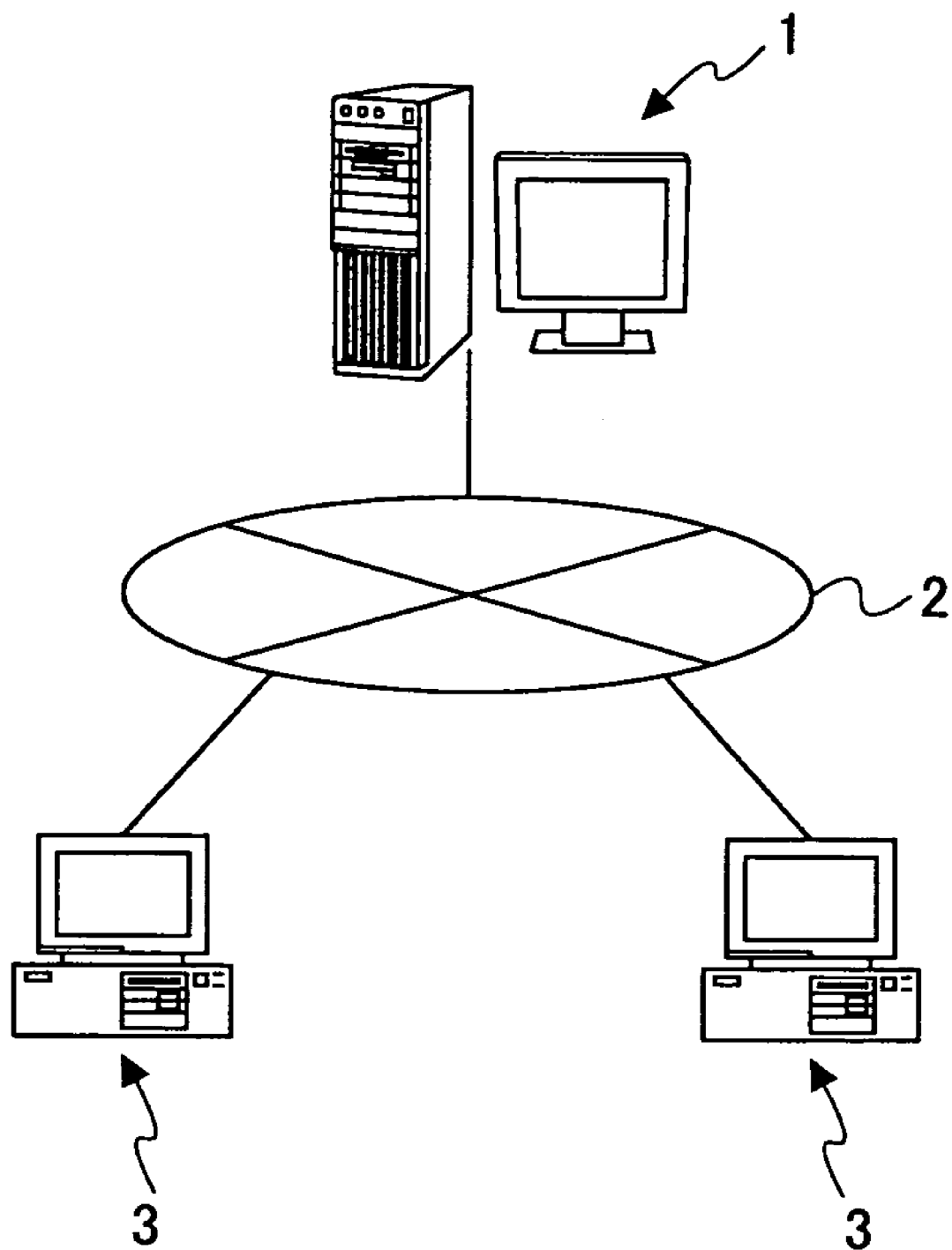
FIG. 8 is a schematic diagram illustrating a system including a server computer corresponding to an image processing apparatus according to one embodiment of the present invention.
Figure 9:
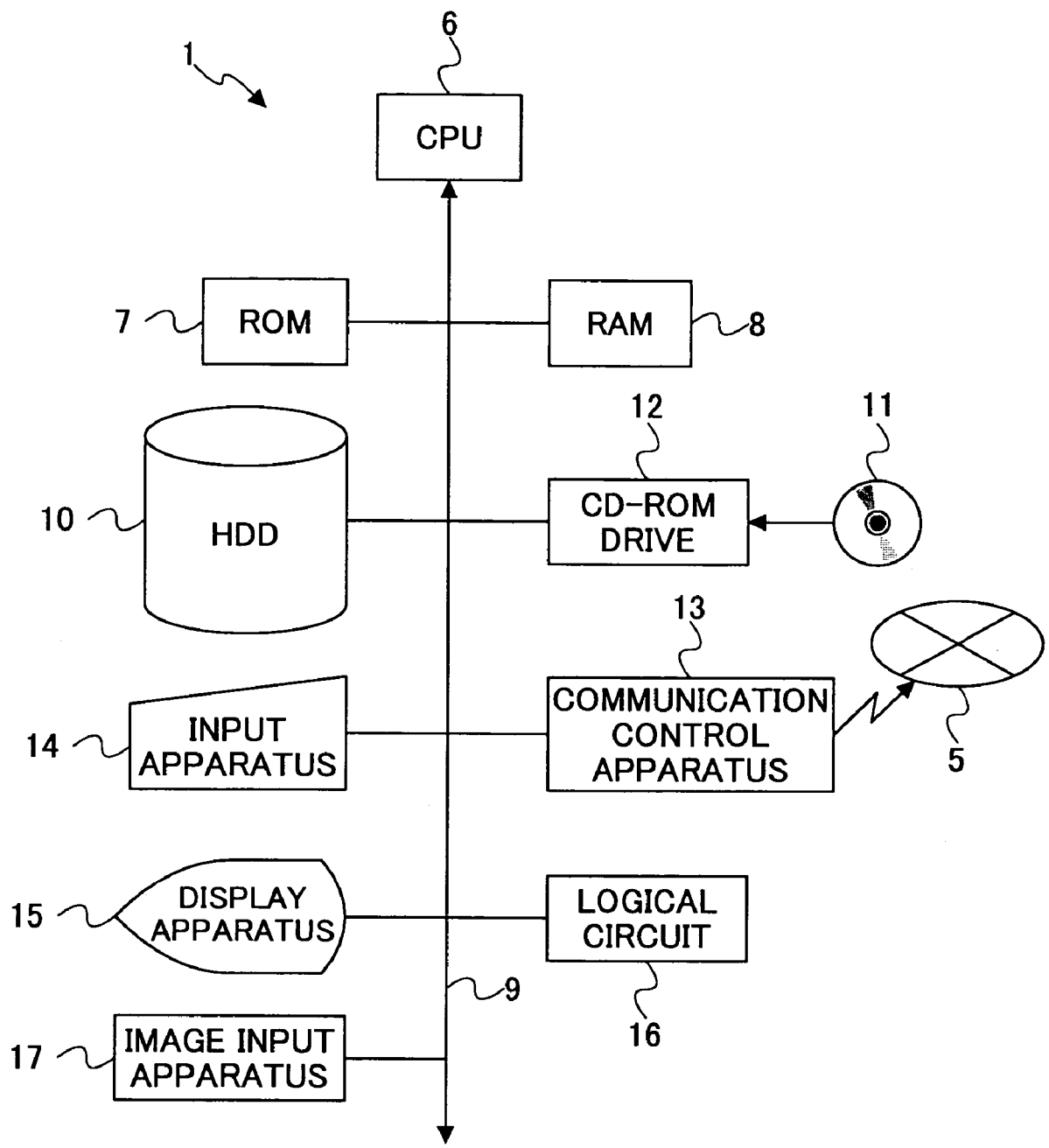
FIG. 9 is a block diagram illustrating a schematic hardware configuration of the server computer.

FIG. 8 is a diagram illustrating a configuration of a system including a server computer 1 corresponding to an image processing apparatus of an embodiment to which the present invention is applied. FIG. 9 is a block diagram showing a hardware configuration of the server computer 1. As is shown in FIG. 8, the server computer 1 may be connected to a client computer 3 such as a personal computer via a network 2 such as the Internet, and is adapted to store various image data.

As is shown in FIG. 9, the server computer 1 includes a CPU (central processing unit) 6, corresponding to a main component of the server computer 1, that controls the operations of the server computer 1. The CPU 6 is connected to a ROM (read only memory) 7 and a RAM (random access memory) 8 via a bus 9, the ROM 7 storing programs such as a BIOS (basic input/output system), and the RAM 8 storing various types of data that may be re-written. Since data stored in the RAM 8 may be re-written, the RAM 8 is used as a working area for the CPU 6. For example, the RAM 8 may function as an input buffer.

Additionally, the bus 9 is connected via an I/O element (not shown) to a HDD (hard disk drive) 10, a CD-ROM drive 12 that is capable of reading a CD-ROM 11 used as a mechanism for reading computer software corresponding to a distributed program, a communication control apparatus 13 that administers communications between the server computer 1 and the external network 2, an input apparatus 14 such as a mouse and/or a keyboard, a display apparatus 15 such as a CRT (cathode ray tube) or a LCD (liquid crystal display), and an image input apparatus 17, such as an image scanner or a digital camera, that inputs an image. Also, a logic circuit 16 is connected to the CPU 6 via the bus 9.

The CD-ROM 11 shown in FIG. 9 corresponds to an embodiment of a storage medium of one embodiment of the present invention and may store an OS (operating system) and other various types of computer software therein. The CPU 6 reads the computer software stored in the CD-ROM 11 using the CD-ROM drive 12 and installs the read out computer software in the HDD 10.

It is noted that various types of media other than the CD-ROM 11 may be used as the storage medium of one embodiment of the present invention. For example, various optical disks such as a DVD, various magneto-optical disks, various magnetic disks such as a flexible disk, and semiconductor memory may be used. Also, computer software may be downloaded from the network 2 such as the Internet via the communication apparatus 13, and installed in the HDD 10. In this case, a storage apparatus that stores the computer software and is implemented in a server corresponding to the sender of the computer software may also correspond to the storage medium of one embodiment of the present invention. The computer software may be software operating on a predetermined OS, and in such case, the software may be that for administering the OS to take over a portion of the various processes being performed in the server computer 1 that are described below, or the software may be included as a portion of a collection of program files making up predetermined application software or an OS, for example.

Among the various types of computer software stored in the storage medium, an image processing program for processing an image is stored in the HDD 10 of the server computer 1 described above. The image processing program realizes a program of one embodiment of the present invention. Through the processes executed by the CPU 6 based on this image processing program, various functions corresponding to various units of the server computer 1 may be realized. It is noted that when processing in real time becomes important, the processing speed is preferably increased. In such case, the various functions are preferably realized by the operations of the logic circuit 16.

In the following, the functions that are performed by the processes executed by the CPU 6 based on the image processing program are described.

Figure 10:
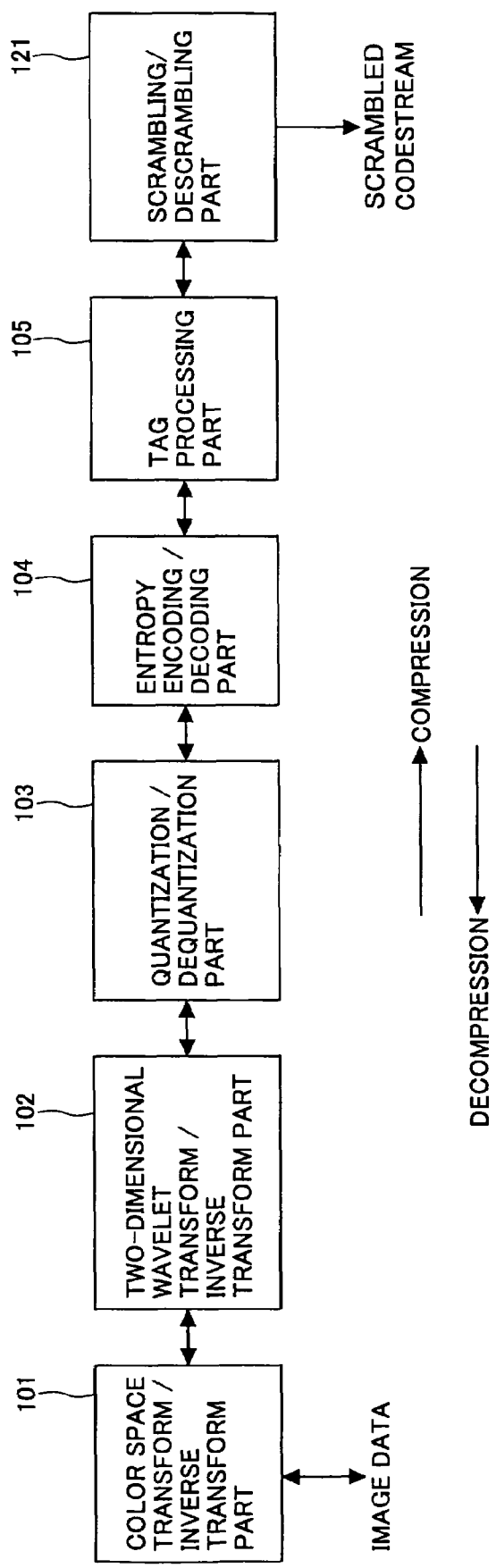
FIG. 10 is a block diagram illustrating functions realized by processes executed by a CPU based on an image processing program.

FIG. 10 is a block diagram showing the functions performed by the processes executed by the CPU 6 based on an image processing program of the present embodiment. As is shown in this drawing, in the server computer 1, the functions of the color space transform/inverse transform unit 101, the two-dimensional wavelet transform/inverse transform unit 102, the quantization/dequantization unit 103, the entropy encoding/decoding unit 104, and the tag processing unit 105 are realized by the processes executed by the CPU 6 based on the image processing program of the present embodiment. The functions of these units are identical to those described above. In the present embodiment, a scrambling/descrambling unit 121 is additionally implemented after the tag processing unit 105. Details of the scrambling/descrambling unit 121 are described below.

The scrambling/descrambling unit 121 performs a process of scrambling encoded data by interchanging tile data of a same position but of different color components within the encoded data and a process of restoring the scrambled data into the original encoded data in a state before the tile data have been interchanged. The encoded data being subject to the processing at the scrambling/descrambling unit 121 correspond to image data divided into a plurality of tiles (rectangular regions) on each of which tiles a two-dimensional wavelet transform process, a quantization process and an encoding process are performed.

FIGS. 11 and 12 are data diagrams used for illustrating the scrambling process performed on image data by the scrambling/descrambling unit 121 according to the present embodiment. FIG. 11 is a data diagram showing a configuration of encoded source image data on which a scrambling process is not performed, the source image data including tiles 201, 202, and 203 corresponding to color components R, G, and B, respectively. FIG. 12 is a data diagram illustrating the encoded source image data including the tiles 201, 202, and 203 corresponding to color components R, G, and B, respectively, on which data the scrambling process is performed.

As is described above, the entropy encoding/decoding unit 104 performs the encoding process on the tiles 201, 202, and 203 corresponding to the color components R, G, and B through probability estimation based on the context and the subject bits to be encoded. In FIG. 11, with respect to the tiles 201, 202, and 203 of the components R, G, and B included in the encoded source image data on which the scrambling process is not performed, the R (red) component (component 0) includes tiles 201 numbered R00~R15 arranged in order from the upper left hand side to the lower right hand side; the G (green) component (component 1) includes tiles 202 numbered G00~G15 arranged in order from the upper left hand side to the lower right hand side; and similarly, the B (blue) component (component 2) includes tiles 203 numbered B00~B15 arranged in order from the upper left hand side to the lower right hand side.

In FIG. 12 showing the tiles 201, 202, and 203 of components R, G, and B of the encoded source image data on which scrambling is performed, the encoded data of the tiles 201, 202, and 203 of a same position but of different color components are interchanged within a portion corresponding to a ROI (region of interest) 211. Specifically, in the R (red) component (component 0), G05 is placed at the position originally for R05, B06 is placed at the position originally for R06, and B09 is placed at the position originally for R09. In the G (green) component (component 1), B05 is placed at the position originally for B05, R06 is placed at the position originally for G06, and B10 is placed at the position originally for G10. In the B (blue) component (component 2), R05 is placed at the position originally for B05, G06 is placed at the position originally for B06, and G10 is placed at the position originally for B10.

According to the present embodiment, compressed data of the tiles 201, 202, and 203 of the components R, G, and B are decompressed using the server computer 1 shown in FIG. 10, for example. In this case, the data are dequantized at the quantization/dequantization unit 103, after which a two-dimensional wavelet inverse transform process is performed on the data at the two-dimensional wavelet transform/inverse transform unit 102, and a color space inverse transform process is performed at the color space transform/inverse transform unit 101. In this way, the image data may be in a viewable state. Herein, since image data corresponding to tiles of a same position but of a different color component are interchanged in the scrambled image data of FIG. 12, if the scrambled image data shown in FIG. 12 are decompressed in this manner, the shape of the image itself may not be changed and merely the color attributed to the shape of the image may be changed. Thus, the image based on the viewable decompressed image data obtained from the scrambled image data of FIG. 12 corresponds to a scrambled image but the original image may still be recognizable to a certain degree.

The scrambling/descrambling unit 121 performs an inter-code transform process and an inter-code inverse transform process in order to realize the scrambling process and the descrambling process described above. The inter-code transform process corresponds to a process of scrambling encoded data by interchanging encoded data corresponding to tiles of a same position but of different color components, the encoded data corresponding to image data divided into a plurality of tiles on each of which tiles a two-dimensional wavelet transform process, a quantization process, and an encoding process are performed. The inter-code inverse transform process corresponds to a process of restoring the scrambled data back to the original encoded data in a state before the tile data interchanging is performed.

Details of the inter-code transform process and the inter-code inverse transform process are described below with reference to FIGS. 13 through 16.

Figure 13:
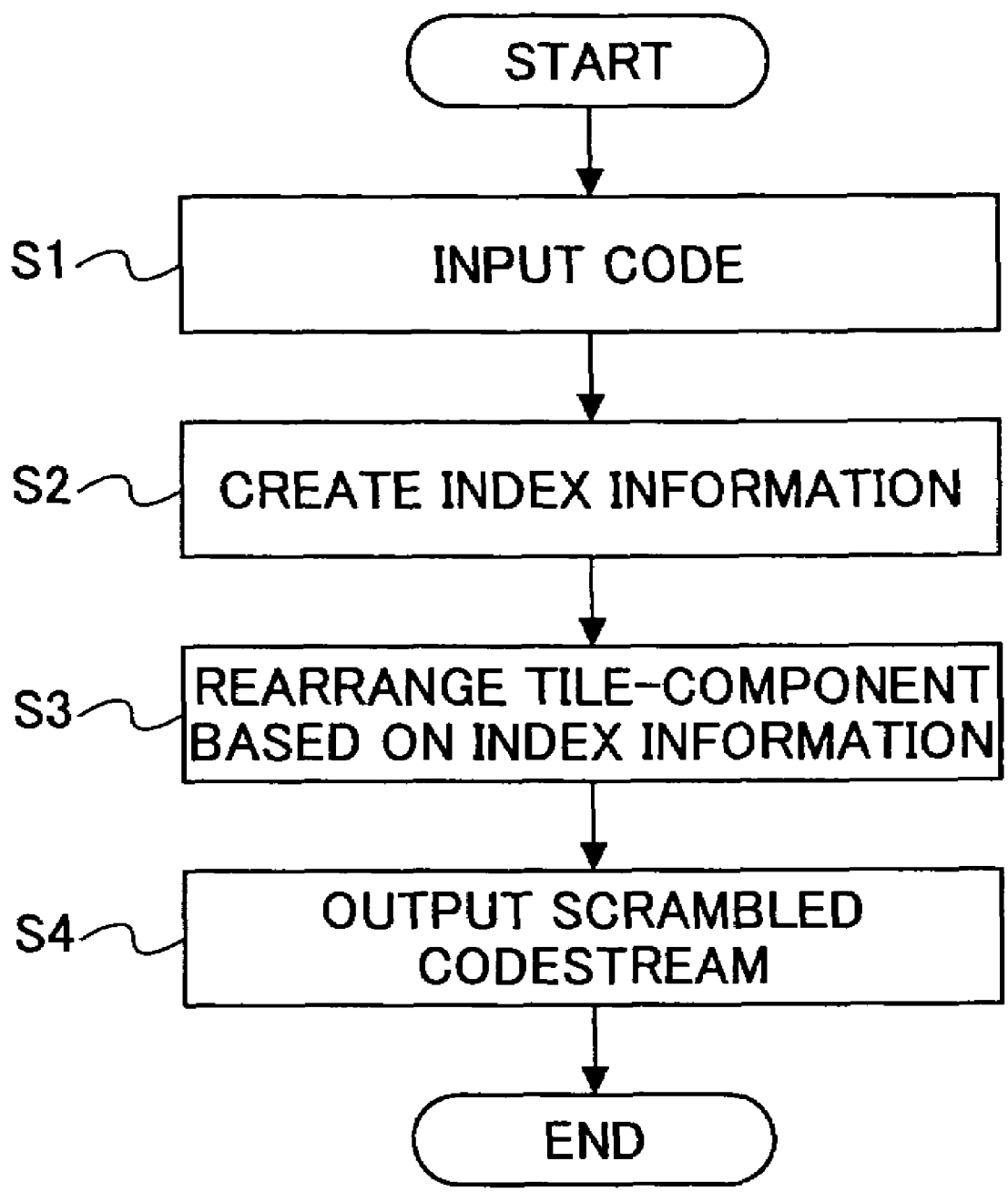
FIG. 13 is a flowchart illustrating a process flow of a scrambling process.
Figure 16:
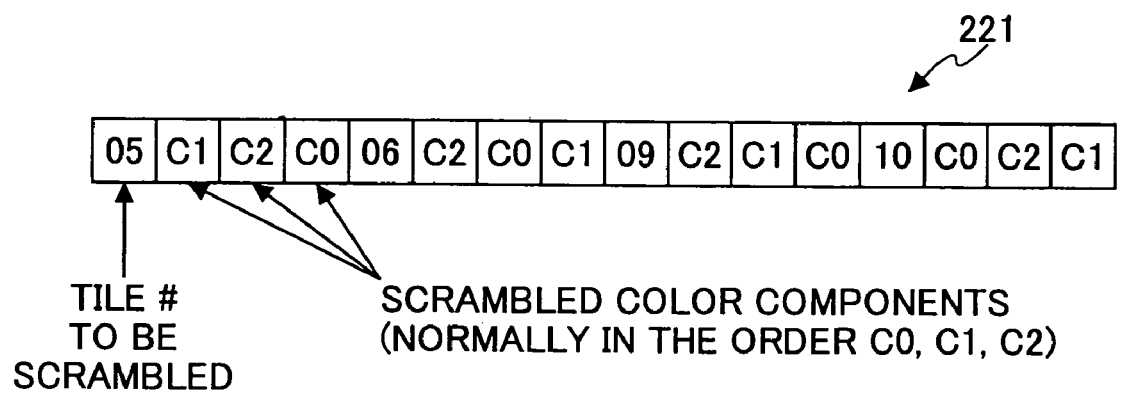
FIG. 16 is a data diagram illustrating index information corresponding to a scramble decipher key.

FIG. 13 is a flowchart illustrating a process flow of the scrambling process. FIG. 14 is a data diagram illustrating a code stream generated by the tag processing unit 105 representing the tiles 201, 202, and 203 of the color components R, G, and B on which the scrambling process is not performed. FIG. 15 is a data diagram illustrating a code stream generated by the tag processing unit 105 representing the tiles 201, 202, and 203 of the color components R, G, and B, on which the scrambling process is performed. FIG. 16 is a data diagram illustrating index information corresponding to a scramble decipher key.

The functions of the scrambling/descrambling unit 121 may be realized by a computer (not shown) implemented in an image processing apparatus (e.g., server computer 1) that executes the processes of the flowchart of FIG. 13.

First, in step S1, code that is arranged into a code stream at the tag processing unit 105 is input to a storage area (not shown). The code may, for example, be in a state as shown in FIG. 14. In FIG. 14, tag SOC (start of code steam) is followed by code corresponding to the tiles 201 of the R (red) component (component 0) from R00 to R15, code corresponding to tiles 202 of the G (green) component (component 1) from G00 to G15, and code corresponding to tiles 203 of the B (blue) component (component 2) from B00 to B15, which are then followed by tag EOC (end of code stream) that ends the code stream.

Then, in step S2, index information 221 is generated. The index information 221 may establish rules for interchanging the encoded data, and may have a configuration as shown in FIG. 16. As is shown in FIG. 14, the code stream generated by the tag processing unit 105 is arranged in the order R, G, B; that is, component 0, component 1, and then component 2. In the present embodiment, the index information 221 establishes a rule of shifting the order of the components from the ordinary order of 0, 1, 2 for the files 201, 202, and 203 that are to be scrambled. In the example of FIG. 16, for the file number 05, the order of the components is set to 1, 2, 0, that is, GBR; for the file number 06, the order of the components is set to 2, 0, 1, that is, BRG; for the tile number 09, the order of the components is set to 2, 1, 0, that is, BGR; and for the tile number 10, the order of the components is set to 0, 2, 1, that is, RBG Next, in step S3, a process of ranging the tile data (color difference data) is performed on predetermined codes of the code stream obtained at the tag processing unit 105 based on the index information 221 generated in step S2. For example, when the index information 221 shown in FIG. 16 is used to rearrange the color difference data, an interchanging process is performed on the code stream obtained from the tag processing unit 105 so that for tile number 05, the components are arranged in the order 1, 2, 0, that is, GBR; for tile number 06, the components are arranged in the order 2, 0, 1, that is, BRG; for tile number 09, the components are arranged in the order 2, 1, 0, that is, BGR; and for the tile number 10, the components are arranged in the order 0, 2, 1, that is, RBG In this way, the encoded data are rearranged to have a configuration as shown in FIG. 15, and the scrambling process on the code stream generated from the tag processing unit 105 can be realized.

By outputting the code stream on which the scrambling process has been performed (step S4), the scrambling function of the scrambling/descrambling unit 121 may be achieved.

On the other hand, in the case of restoring the scrambled code stream into its original state, the reverse of the above processes of steps S1~S4 may be performed.

According to the present embodiment, encoded tile data are interchanged based on the index information 221, and thereby, a scrambling process can be easily realized using the index information 221. Moreover, by referring to the index information 221, the scramble deciphering process can also be easily realized.

Further, at the scrambling/descrambling unit 121 of the present embodiment, the scrambling process is performed by utilizing the sub-band structure of the tiles obtained from a discrete wavelet transform process of the JPEG 2000 algorithm. According to the JPEG 2000 algorithm, the tiles have sub-band structures associated with resolution levels as is illustrated in FIGS. 3, 6, and 7, for example. In the present embodiment, the scrambling/descrambling unit 121 may selectively perform the scrambling process on encoded tile data according to their respective sub-band levels.

Specifically, if a start portion of a bit stream of a predetermined sub-band level is scrambled, the ensuing portions of the bit stream of this level may also be influenced by the scrambling process. For example, scrambling on a large scale may be realized by changing one byte of data.

In the following, an example of selectively performing the scrambling process based on the sub-band levels is described.

Figure 17:
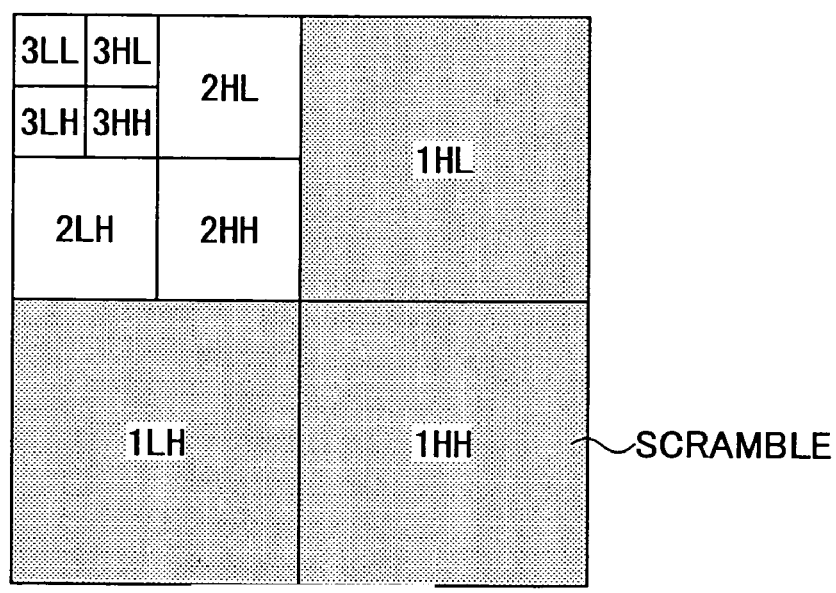
FIG. 17 is a diagram illustrating an exemplary way of selectively performing the scrambling process depending on the sub-band levels.
Figure 18A:
FIGS. 18A and 18B are diagrams illustrating images that can be displayed based on the scrambled code stream of FIG. 17, wherein the image shown in FIG. 18A corresponds to a whole image, and the image shown in FIG. 18B corresponds to a thumbnail image.
Figure 18B:
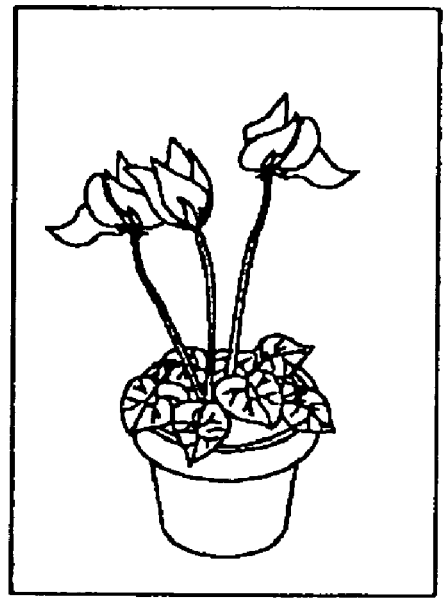

According to the JPEG 2000 algorithm, the use of the sub-band function upon viewing image data is known to facilitate providing a thumbnail image. Thus, as is shown in FIG. 17, a scrambling process is performed on a certain sub-band level (i.e., in the example of FIG. 17, the sub-bands at decomposition level 1 (1HL, 1LH, 1HH)), and upon displaying a thumbnail image, compressed code corresponding to a low resolution image component (e.g., sub-bands at decomposition level 3 (3LL, 3HL, 3LH, 3HH), or sub-bands at decomposition levels 2 and 3 (3LL, 3HL, 3LH, 3HH, 2HL, 2LH, 2H)) are extracted and displayed. That is, by refraining from performing the scrambling process on low resolution image components, and scrambling just the high resolution image components, the processed image in its entirety may be in a scrambled state but the thumbnail image (reduced image) thereof may not be in a scrambled state as illustrated in FIGS. 18A and 18B. Thus, for example, a reduced image may be presented for viewing as a thumbnail image to provide a general overview of the contents of the image.

Providing of Contents

Image data scrambled according to the present embodiment may be used in the commercial distribution of image data over the Internet from a content provider to a user, for example. In the following, the providing of contents in such case is described with reference to FIG. 19.

Figure 19:
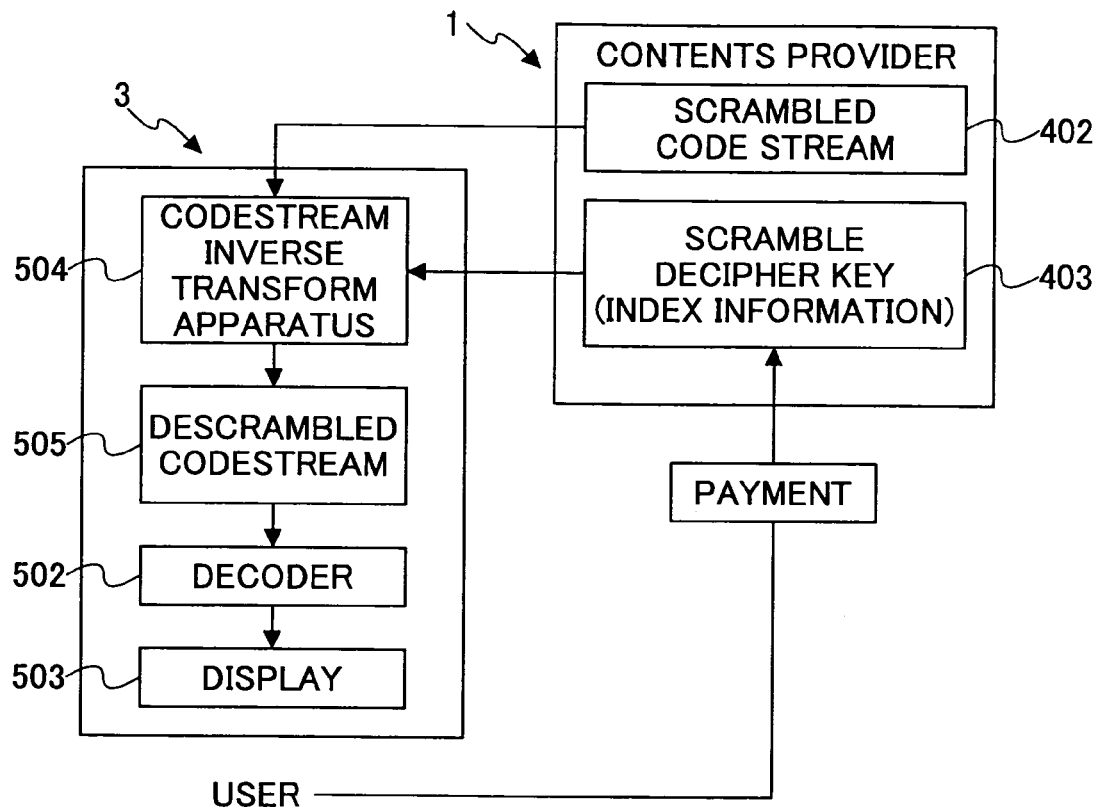
FIG. 19 is a block diagram illustrating a content-providing business model.

FIG. 19 is a block diagram illustrating a content-providing business model. In this drawing, the server computer 1 corresponding to the content provider apparatus provides image data compressed by the image processes according to the JPEG 2000 algorithms as illustrated in FIG. 10 over the Internet. The client computer 3 corresponding to the user apparatus may include a personal computer, for example, that implements software for decompressing image data that are compressed according to the JPEG 2000 algorithm, and the client computer 3 may access the server computer 1 via the Internet. In this way, a user of the client computer 3 is able to view the contents provided by the server computer 1.

In FIG. 19, the server computer 1 provides contents including scrambled code stream 402 corresponding to a scrambled JPEG 2000 code stream. The server computer 1 also stores scramble decipher key 403 corresponding to index information 221 for deciphering the scrambled code stream 402.

The client computer 3 includes a decoder 502 that functions when software is installed for decompressing image data corresponding to encoded code stream data compressed using the JPEG 2000 algorithm. The image data decompressed by the decoder 502 may be displayed on a display 503 for viewing.

The client computer 3 also includes a code stream inverse transform apparatus 504 that functions when software for descrambling the scrambled code stream 402 is interpreted.

Such software may be provided from the server computer 1 together with the scrambled code stream 402, or it may be installed in the client computer 3 beforehand. The code stream inverse transform apparatus 504 descrambles the scrambled code stream 402 based on the scramble decipher key 403, and transforms the code stream into a descrambled code stream 505, which is then sent to the decoder 502.

Under the above architecture, when the client computer 3 accesses the sever computer 1, and the decoder 502 decompresses the scrambled code stream 402 corresponding to the contents provided by the server computer 1 to view the decoded image corresponding to the scrambled code stream 402 on the display 503, an image in a scrambled state is displayed on the display 503; however, a corresponding thumbnail image (reduced image) may be displayed in an unscrambled state. In this way, the user of the client computer 3 may be driven by a desire to have a clear view of the whole image.

Thus, the user of the client computer 3 may make a payment to the server computer 1. In response, the server computer 1 may send the scramble decipher key 403 to the client computer 3. Upon receiving the scramble decipher key 403, the code stream inverse transform apparatus 504 at the personal computer of the client computer 3 may descramble the scrambled code stream 402 based on the scramble decipher key 403 and transform this into the descrambled code stream 505 to send this to the decoder 502. In this way, a clear image based on the descrambled code stream 505 may be displayed on the display 503 of the client computer 3.

It is noted that the payment made to the server computer 1 by the client computer 3 may correspond to authentication information. In such case, the server computer 1 may receive the payment to thereby authenticate the authentication information. This concept may be used, for example, in the sending/receiving of a credit card number over the Internet. In another example, the client computer 3 may perform user registration to the content provider (server computer 1) beforehand, and the client computer 3 may be given a user registration number. In this case, the client computer 3 may send the user registration number to the server computer 1 as authentication information, and the server computer 1 may authenticate the authentication information by confirming its accuracy. In this way, the server computer 1 may charge the client computer 3 each time its user registration number is sent.

Also, the server computer 1 may include in the scramble decipher key 403 information pertaining to a valid term prescribing the validity of the scramble decipher key 403, and a computer program for canceling the function of the scramble decipher key 403 when the valid term is over. The computer program that cancels out the function of the scramble decipher key 403 in response to the expiration of its valid term may be interpreted by the client computer 3, and referring to the information on the valid term of the scramble decipher key 403, the program may cancel out the function of the scramble decipher key 403 when its valid term expires. In this way, measures may be taken against abuse of the system such as a case where the user of the client computer 3 receiving the scramble decipher key 403 circulates the scramble decipher key 403 to other users.

In another example, the contents provided by the server computer 1 to the client computer 3 may not be scrambled by the inter-code transform process at the time they are provided, and a computer program may be included so that the contents may be scrambled by the inter-code transform process after a predetermined time period elapses from the time the contents are provided. Thus, at first, the contents provided to the client computer 3 may be viewed in an unscrambled state; however, the contents may be scrambled by the inter-code transform process by use of the computer program included in the contents after a predetermined time period elapses from the time the contents are provided. In this way, the user of the client computer 3 may be driven by a desire to view the image more clearly, and this in turn triggering the desire to purchase the image.

As is described above, the realization of various processes may be facilitated by installing software (computer program) for executing the processes in the server computer 1 and the client computer 3, for example, so that they may be interpreted.

Also, by performing a scrambling process on compressed code of a level corresponding to high resolution image components and leaving compressed code of a level corresponding to low resolution image components unscrambled, the corresponding decoded image in its entirety may be in a scrambled state but a reduced image decoded from compressed code of the level corresponding to the low resolution image components may be in an unscrambled state. Thus, the reduced image may be viewed as a thumbnail image, for example, so that a general overview of the contents of the image may be appreciated.

Figure 20:
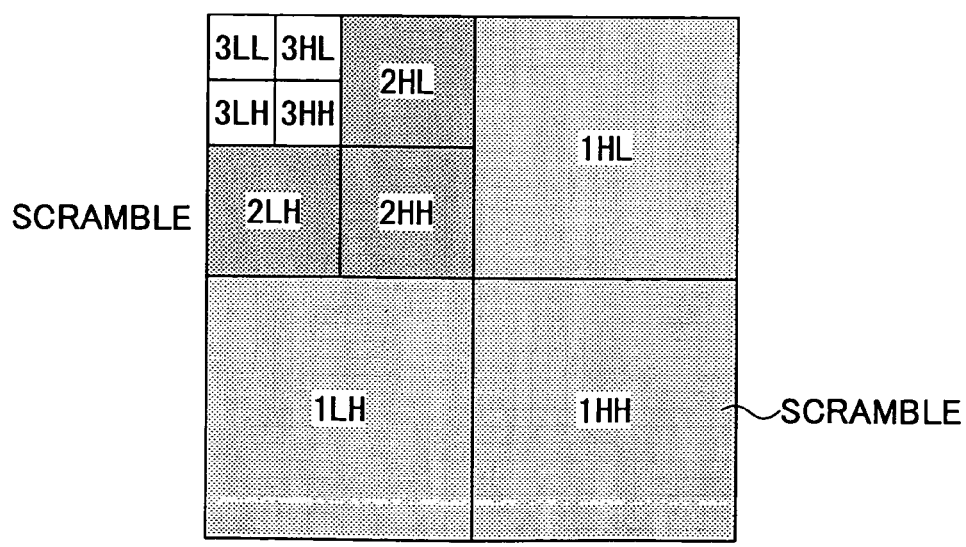
FIG. 20 is a diagram illustrating a variation example of the way of selectively performing the scrambling process depending on the sub-band levels.

In another example, the scrambling process may be performed on code of a plurality of sub-band levels as is shown in FIG. 20 (i.e., in the example of FIG. 20, sub-bands 1HL, 1LH, 1HH at decomposition level 1, and sub-bands 2HL, 2LH, 2HH at decomposition level 2), and the contents being provided may be descrambled in stages. In this embodiment, the resolution of the image being provided may be changed according to the payment being made. For example, 100 yen may be charged for descrambling just the sub-bands at decomposition level 2, and 500 yen may be charged for descrambling both the sub-bands at decomposition level 1 and the sub-bands at decomposition level 2.

In the following, another embodiment of the present invention is described with reference to FIG. 21. It is noted that elements that are identical to the elements described in the previously described embodiment are given the same referential notations, and their descriptions are omitted. The difference between the present embodiment and the previously described embodiment lies in the processes performed in the scrambling/descrambling unit 121.

Specifically, in the scrambling/descrambling unit 121 of one embodiment, the scrambling process is performed using the sub-band structure obtained from the discrete wavelet transform process of the JPEG 2000 algorithms. In the scrambling/descrambling unit 121 of the present embodiment, the scrambling process is performed using the processing unit of the JPEG 2000 algorithms.

According to the JPEG 2000 algorithms, processing of image data may be performed in units of the rectangular regions (tiles) corresponding to encoding units into which the image data are divided, as is described in FIG. 4, for example. In the scrambling/descrambling unit 121 of the present embodiment, the scrambling process is selectively performed on the rectangular regions (tiles) making up the image.

More specifically, since image data are transformed into a code stream such as that shown in FIG. 7 (i.e., data diagram in the middle), for example, every other rectangular region (tile) in the code stream may be scrambled in selectively performing the scrambling process on the rectangular regions (files) making up the image. In this case, by scrambling the starting portion of the bit stream of a predetermined rectangular region (tile), the ensuing portions of the bit stream may also be influenced by the scrambling. According to this embodiment, scrambling may be performed on a large scale by changing 1 byte of data, for example.

Figure 21A:
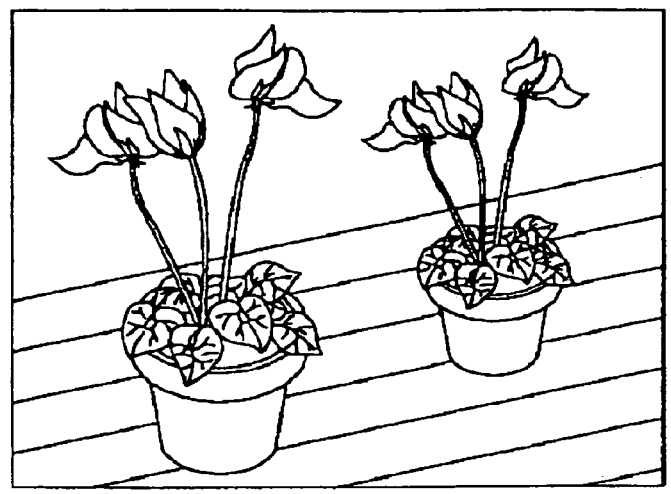
Figure 21B:
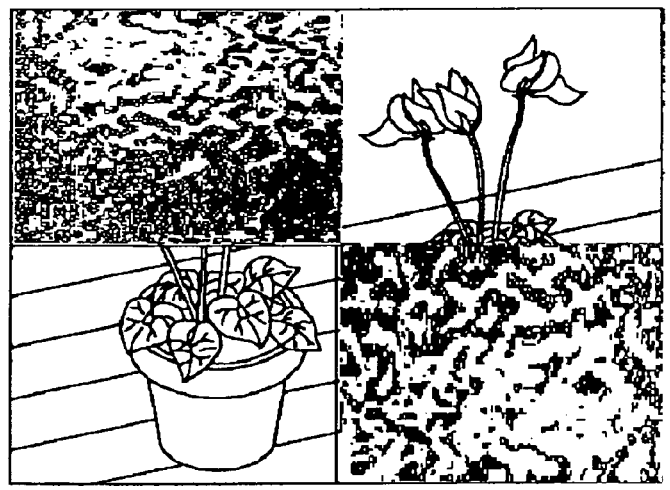
Figure 21C:
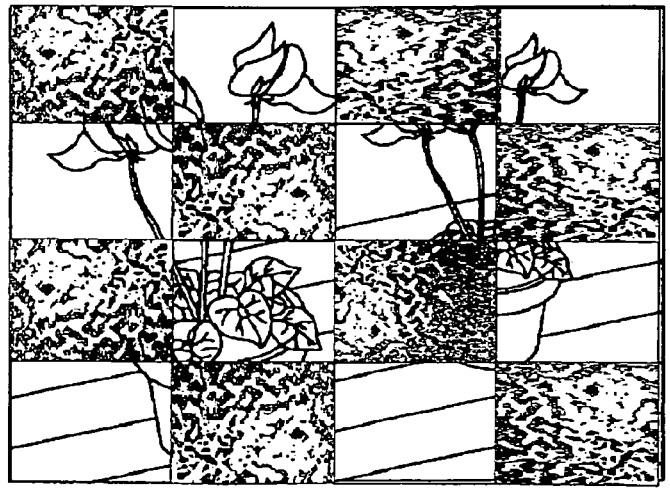

FIGS. 21A-21C illustrate exemplary cases of selectively performing the scrambling process on rectangular regions (tiles) making up an image. FIGS. 21B and 21C respectively show examples of scrambled images of a source image shown in FIG. 21A, FIG. 21B illustrating a case in which the source image is divided into 4 tiles, and FIG. 21C illustrating a case in which the source image is divided into 16 tiles. As is shown in these drawings, some parts of the image corresponding to certain tiles are scrambled whereas other parts of the image are left unscrambled. Thus, the parts on which the scrambling is not performed may be viewed to thereby present a general overview of the contents of the image.

The present application is based on and claims the benefit of the earlier filing date of Japanese Patent No. 2003-4025131 filed on Jan. 31,2003, the entire contents of which are hereby incorporated by reference.

What is claimed is:

1. An image processing apparatus to apply a discrete wavelet transform to a pixel value of each of at least one rectangular region into which image data are divided and to generate a hierarchically compressed code stream, the apparatus comprising:

scrambling means for performing a scrambling process on code data of the compressed code stream, wherein the scrambling process that includes interchanging code data of at least two tiles of different color components corresponding to a same position, so as to create a scrambled image from which an original image may be recognizable, the interchanged different color components including a red component, a green component, and a blue component.

2. An image processing apparatus to apply a discrete wavelet transform to a pixel value of each of at least one rectangular region into which image data are divided and to generate a hierarchically compressed code stream, the apparatus comprising:

scrambling means for performing a scrambling process that includes generating index information defining a rule for interchanging code data of the compressed code stream and interchanging color difference components of the code data based on the index information, so as to create a scrambled image from which an original image may be recognizable, the interchanged color difference components including a red component, a green component, and a blue component.

3. The image processing apparatus defined in claim 1 or 2, wherein the scrambling process is selectively performed with respect to each sub band level.

4. The image processing apparatus as claimed in claim 1 or 2, wherein the scrambling processing is performed on a start portion of a bit stream of a predetermined sub band level.

5. The image processing apparatus as claimed in claim 1 or 2, wherein the scrambling process is performed on compressed code of a level corresponding to a high resolution image component within the compressed code stream without being performed on code other than the compressed code of the level corresponding to the high resolution image component.

6. An image processing method comprising:

applying a discrete wavelet transform to a pixel value of each of a least one rectangular region into which image data are divided and generating a hierarchically compressed code stream;

further comprising performing a scrambling process on code data of the compressed code stream, wherein the scrambling process that includes interchanging code data of at least two tiles of different color components corresponding to a same position, so as to create a scrambled image from which an original image may be recognizable, the interchanged different color components including a red component, a green component, and a blue component.

7. An image processing method comprising:

applying a discrete wavelet transform to a pixel value of each of at least one rectangular region into which image data are divided and generating a hierarchically compressed code stream;

further comprising performing a scrambling process that includes generating index information defining a rule for interchanging code data of the compressed code stream and interchanging color difference components of the code data based on the index information, so as to create a scrambled image from which an original image may be recognizable, the interchanged color difference components including a red component, a green component, and a blue component.

8. The image processing method as claimed in claim 6 or 7, wherein the scrambling process is selectively performed with respect to each sub band level.

9. The image processing method as claimed in claim 6 or 7, wherein the scrambling processing is performed on a start portion of a bit stream of a predetermined sub band level.

10. The image processing method as claimed in claim 6 or 7, wherein the scrambling process is performed on compressed code of a level corresponding to a high resolution image component within the compressed code stream without being performed on code other than the compressed code of the level corresponding to the high resolution image component.

11. An article of manufacture comprising one or more computer-readable storage media having instructions stored thereon which, when executed by a computer, cause the computer to perform an image processing method that applies a discrete wavelet transform to a pixel value of each of a least one rectangular region into which image data are divided and generates a hierarchically compressed code stream, the image processing method comprising:

performing a scrambling process on code data of the compressed code stream which scrambling process involves interchanging code data of at least two tiles of different color components corresponding to a same position, so as to create a scrambled image from which an original image may be recognizable, the interchanged different color components including a red component, a green component, and a blue component.

12. An article of manufacture comprising one or more computer-readable storage media having instructions stored thereon which, when executed by a computer, cause the computer to perform an image processing method that applies a discrete wavelet transform to a pixel value of each of a least one rectangular region into which image data are divided and generates a hierarchically compressed code stream, the image processing method comprising:

performing a scrambling process that involves generating index information defining a rule for interchanging code data of the compressed code stream and interchanging color difference components of the code data based on the index information, so as to create a scrambled image from which an original image may be recognizable, the interchanged color difference components including a red component, a green component, and a blue component.

13. The article of manufacture as defined in claim 11 or 12, wherein the scrambling process is selectively performed with respect to each sub band level.

14. The article of manufacture as defined in claim 11 or 12, wherein the scrambling processing is performed on a start portion of a bit stream of a predetermined sub band level.

15. The article of manufacture as defined in claim 11 or 12, wherein the scrambling process is performed on compressed code of a level corresponding to a high resolution image component within the compressed code stream without being performed on code other than the compressed code of the level corresponding to the high resolution image component.

* * * * *

UNITED STATES PATENT AND TRADEMARK OFFICE
CERTIFICATE OF CORRECTION

PATENT NO. : 7,583,848 B2
APPLICATION NO. : 10/769191
DATED : September 1, 2009
INVENTOR(S) : Hiroshi Kakii It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1193 days.

Signed and Sealed this

Fourteenth Day of September, 2010

David J. Kappos
*Director of the United States Patent and Trademark Office*